No. 668,917. Patented Feb. 26, 1901.
C. M. HAYNES.
NOSE CALIPERS.
(Application filed Sept. 19, 1900.)

(No Model.)

Witnesses
Jno. [illegible]
Harry A. Knight

Inventor
Charles M. Haynes
By Knight Bros.
Attorneys

UNITED STATES PATENT OFFICE.

CHARLES M. HAYNES, OF CHILLICOTHE, OHIO.

NOSE-CALIPERS.

SPECIFICATION forming part of Letters Patent No. 668,917, dated February 26, 1901.

Application filed September 19, 1900. Serial No. 30,488. (No model.)

*To all whom it may concern:*

Be it known that I, CHARLES M. HAYNES, a citizen of the United States, and a resident of Chillicothe, in the county of Ross and State of Ohio, have invented certain new and useful Improvements in Nose-Calipers, of which the following is a specification.

The object of my invention is to furnish an instrument by means of which nasal measurement necessary to the proper fitting of glasses can be ascertained. The optician who is to manufacture the eyeglass must know not only the specifications of the glass which will be required for the eye, but must so fit it into a frame that it will be in a proper position with reference to the eye, and the frame must fit the nose so as to produce that result and at the same time sit comfortably on the nose. There are two things necessary for the manufacturer to know in order to adjust his frame—first, the pupilary distance, and, second, the size and shape of the nose where the guard impinges upon it. The latter, as stated, this instrument is intended to furnish. Manufacturing opticians have had much trouble on this point. Many opticians in getting the facts for the specifications on this point have used ordinary calipers and a rule. They place the calipers at that point on the nose where they think the upper end of the guard would impinge and then close the calipers until they think it impinges on the nose with the same tension that the eyeglass-frame will. The distance between the points or ends of the calipers is measured with an ordinary rule and the specifications thus secured. Of course in the same way the measurement as to the upper and lower ends of the guard is obtained. The measurements thus secured are not accurate and the method is slow and tedious. My instrument fits itself automatically to the nose in exactly the same position that the eyeglass-frame will sit. The operator will of course adjust the instrument until the best position is ascertained. The instrument impinges upon the nose with the same tension that the eyeglass-frame will and the instrument will adjust itself to the bony part of the nose. When the adjustment is thus made, the readings are made at once by looking at the scales provided for that purpose.

My invention consists of the parts and combinations of parts, as will be hereinafter more fully set out.

Figure 1:
Figure 2:
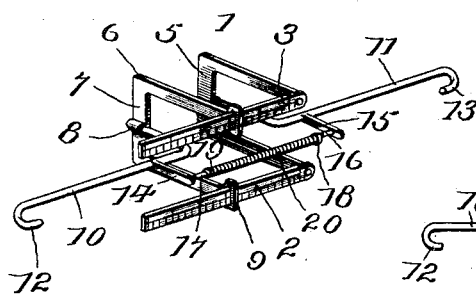
Figure 3:
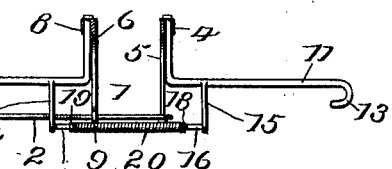
Figure 4:
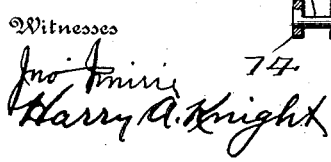

In the drawings, Figure 1 is a view illustrating the use of my invention. Fig. 2 is a perspective view of my invention. Fig. 3 is a horizontal section of the same. Fig 4 is a detail sectional view of the spring.

1 is a guard substantially U-shaped, upon the upper ends of which are pivoted the rules or scales 2 and 3.

4 is a socket formed integral with the cross member 5 of the guard 1. 6 is another guard substantially U-shaped, the cross member 7 of which is provided with a socket 8, while the upper ends of this guard are somewhat enlarged and provided, respectively, with slots or openings 9, in which the rules or scales 2 and 3 are adapted to slide.

10 and 11 are manipulating-handles, one end of each being pivoted, respectively, in the sockets 8 and 4 of the guards 6 and 1, said handles 10 and 11 being provided with a return-bend 12 and 13 on their respective outer ends.

14 and 15 are right-angle extensions integral with the respective manipulating-handles, to the upper ends of each of which is secured one end of split rods 16 and 17, adapted to slide upon each other.

18 is a washer secured upon the free end of a split rod 17 rigidly, and 19 is a similar washer secured upon the free end of the rod 16. Both of said rods are adapted to slide through said washers, as clearly shown in Fig. 4.

20 is a coil-spring secured around the rods 16 and 17, the ends of said spring abutting against the washers 18 and 19.

In use when it is desired to ascertain the nasal measurement the instrument is held in such position that the scales 2 and 3 are above each other vertically, and in order to adjust the instrument to the nose the guards are extended by pulling in opposite directions upon the handles 10 and 11, whereupon the guards are placed upon the nose, when the spring 20 draws the guards toward each other until they are firmly seated on each side of the nose. This seating is readily and accurately made by reason of the fact that said guards are pivotally mounted on the manipulating-handles. As soon as the guards are firmly seated accurate measurement is obtained by reading the scales 2 and 3, which give the upper and lower measurement of that part of the nose on which the guards of the eyeglass-frame will impinge, thus insuring an accurate adjustment of the eyeglass-guard and a comfortable fit of the same to the nose without unnecessary pressure.

Having thus described my invention, the following is what I claim as new therein and desire to secure by Letters Patent:

1. In a nose-caliper, the combination with a suitable frame, of two independent nose-guards, pivotally mounted on the frame and a scale coöperating with said guards.

2. In a nose-caliper, the combination with a frame, comprising two members, a nose-guard pivotally mounted on each of said frame members, and scales for each of said guards.

3. In a nose caliper, a frame, nose-guards independently pivotally mounted on the frame, and scales for registering the angular position of the respective guards at different points.

4. In a nose-caliper, a frame, nose-guards independently pivotally mounted on the frame and scales for registering the angular position of the respective guards at different points, a spring connecting the guards and tending to draw the guards toward each other.

5. In a nose-caliper the combination with manipulating-handles of a guard pivotally mounted on the inner end of each of said handles, scales pivotally secured to one of said guards and having a sliding connection with the other guard for registering the angular position of the guards at different points, and a resilient connection between the respective manipulating-handles.

CHARLES M. HAYNES.

Witnesses:
WILLY G. HYDE,
JAMES A. CAHILL.